UNITED STATES PATENT OFFICE.

JOHN P. IHART, OF NEW YORK, N. Y.

METHOD OF PREPARING MATERIALS FOR PURIFYING GAS.

SPECIFICATION forming part of Letters Patent No. 670,450, dated March 26, 1901.

Application filed November 21, 1900. Serial No. 37,232. (No specimens.)

*To all whom it may concern:*

Be it known that I, JOHN P. IHART, a citizen of the United States, residing in the city, county, and State of New York, have invented a new and useful Method of Preparing Materials for Purifying Illuminating-Gas, of which the following is a specification.

My invention relates to the art of making materials suitable for removing sulfureted hydrogen from illuminating or fuel gas; and the object of my invention is to prepare a material which is as efficient as that now commonly used, can be made active in a much shorter time, and is produced at a lower cost. The material heretofore commonly used for this purpose has been metallic iron, such as iron-borings oxidized by exposure to the action of air and water; but oxidation by this means requires a considerable length of time. I have discovered that spent pyrites (the waste from the manufacture of sulfuric acid, commonly known as "pyrites-cinders") and also the iron ores—such as the hematites, for instance—can be used as a purifying material when subjected to my process.

In practicing my invention I preferably divide the pyrites-cinders or iron ore into small particles by any suitable process and spread such ore or pyrites-cinders in heaps from, say, four to eight inches high. I then wet the material with an aqueous solution of any metallic salt capable of forming a hydrate with an alkali, such as lime, in the presence of an iron oxid. I prefer lime as being the cheapest. Suitable salts for this purpose are ferrous sulfate, ferric sulfate, manganous sulfate, manganic sulfate, ferric chlorid, ferrous chlorid, &c. A solution containing one to five per cent. of the salt will be effective, although a stronger solution may be used, and I use enough of the solution to thoroughly wet the different particles of the ore or pyrites-cinders and coat them with the salt. I then add the alkali in sufficient quantity to form a hydrate and mix it with the wet ore or cinders, and I recommend that a surplus of alkali be used in order to neutralize any free acid that may be present. The compound is then ready for immediate use as an active purifying agent, and it can either be used alone or it may be mixed with sawdust or other similar suitable material to produce porosity and provide greater permeability for the gas in the well-known manner. Although a single wetting of the ore or pyrites-cinders with the salt solution will make the compound active to some extent, I have found that it is better to use the solution several times successively, allowing a short interval of time between each wetting. So, also, the salt may be mixed in a dry condition with the pyrites-cinders or ore and the water and lime subsequently added, or the salt, lime, and ore or pyrites-cinders may all be mixed together in a dry state and the water then added; but I prefer the method above described.

As pyrites-cinders and the iron ores, including the hematites, are all of the ore nature and are substantially equivalents for each other in my process, I include them all under the general term "iron ore" in the appended claims, although I prefer the use of "pyrites-cinders."

Having thus described my invention, what I claim is—

1. The process of preparing a material for purifying gas which consists in mixing together an iron ore, water, a metallic salt that forms a hydrate with an alkali in the presence of an iron oxid, and an alkali, substantially as described.

2. The process of preparing a material for purifying gas which consists in mixing together an iron ore, water, sulfate of iron, and lime, substantially as described.

3. The process of preparing a material for purifying gas which consists in mixing together pyrites-cinders, water, a metallic salt that forms a hydrate with an alkali in the presence of an iron oxid, and an alkali, substantially as described.

4. The process of preparing a material for purifying gas which consists in mixing together pyrites-cinders, water, sulfate of iron, and lime, substantially as described.

JOHN P. IHART.

Witnesses:
HARRY V. FOUNTAIN,
J. E. HINDON HYDE.